UNITED STATES PATENT OFFICE.

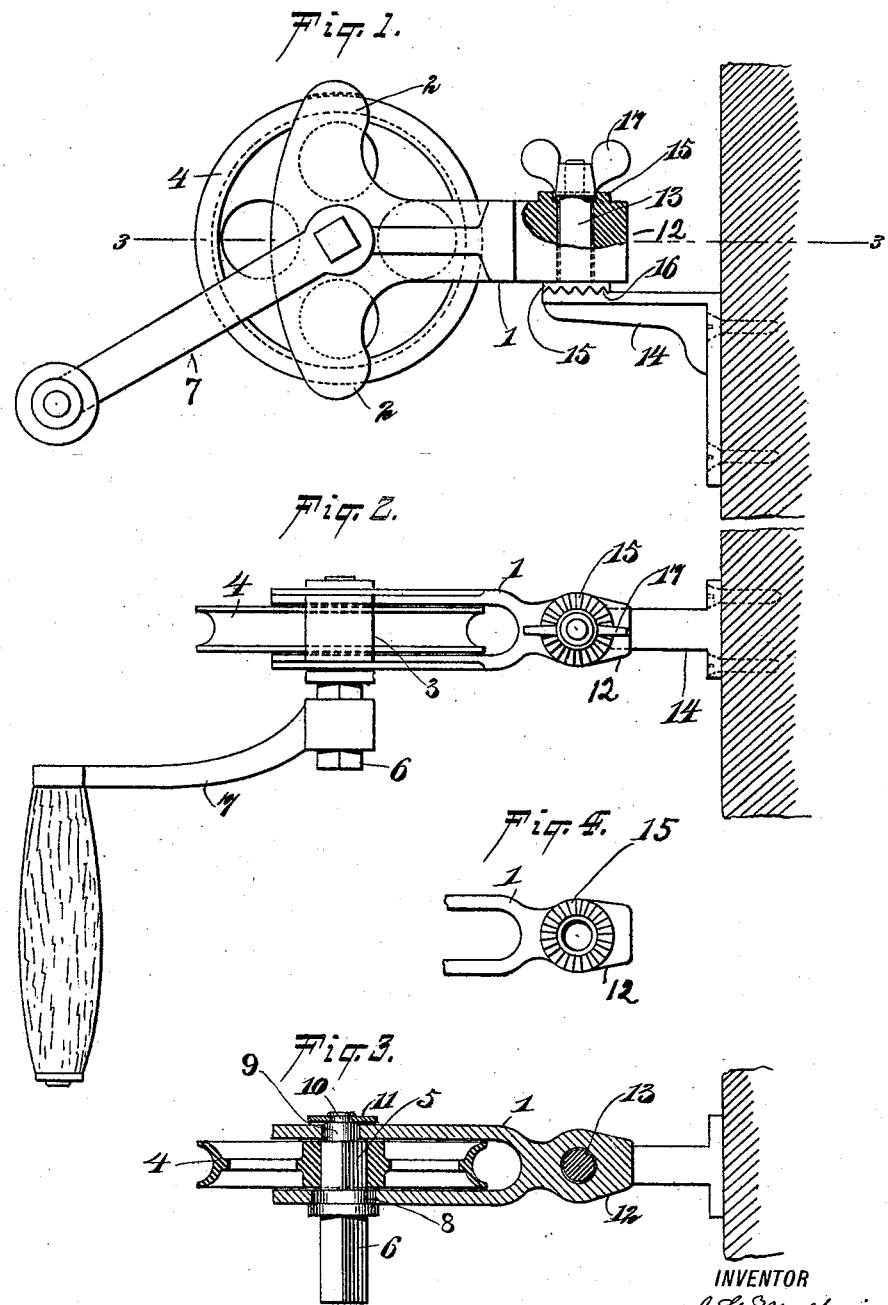

ALEXANDER G. MOLTENI, OF HOBOKEN, NEW JERSEY.

CLOTHES-LINE CONVEYER.

SPECIFICATION forming part of Letters Patent No. 581,169, dated April 20, 1897.

Application filed May 28, 1896. Serial No. 593,478. (No model.)

*To all whom it may concern:*

Be it known that I, ALEXANDER G. MOLTENI, of Hoboken, in the county of Hudson and State of New Jersey, have invented new and useful Improvements in Clothes-Line Conveyers, of which the following is a full, clear, and exact description.

This invention relates to sheaves or pulleys designed to be attached to a window-frame or other support and by means of which a clothes-line may be drawn in and out, as occasion may require, to place the clothes thereon or to take them off; and the object is to so construct the parts that the pulley-frame may be clamped or secured at any desired horizontal angle and which may be cheaply made.

I will describe a clothes-line conveyer embodying my invention and then point out the novel features in the appended claim.

Reference is to be had to the accompanying drawings, forming a part of this specification, in which similar characters of reference indicate corresponding parts in all the views.

Figure 1 is a side elevation, in partial section, of a device embodying my invention. Fig. 2 is a top plan view thereof. Fig. 3 is a section on the line 3 3 of Fig. 1. Fig. 4 is a plan view of a clutch-section employed.

The invention comprises a bifurcated frame 1, having at its outer end upwardly and downwardly extended arms 2, opposite arms being connected at the ends by cross-pieces or bridges 3. Journaled to rotate in the frame 1 is a sheave 4. This sheave is mounted on a shaft 5, which is angular in cross-section at its portion passing through said sheave and also at its outward portion 6, to which a crank 7 is designed to be attached. This shaft 5 has a circular portion 8, having a bearing in one portion of the frame 1, and a reduced circular portion 9, having a bearing in the other portion of said frame 1. From the reduced portion 9 a further-reduced portion 10 extends outward, and to this reduced portion 10 is secured by riveting or otherwise a washer or disk 11.

The frame 1 at its rear end has a bearing-block 12, provided with a vertical perforation through which a spindle 13 on a bracket 14 passes. Surrounding the perforation in the block 12, at both the upper and lower sides of the block, are formed clutch-teeth 15, designed to engage similar teeth 16 on the upper side of the bracket 14. By engaging the teeth 15 with the teeth 16 and screwing down a set-nut 17 on the upper end of the spindle 13 it is obvious that the frame 1 may be held at any desired horizontal adjustment, and by forming teeth 15 on both sides of the block 12 it is obvious that the device may be used either side up, that is, to bring the crank-handle on the left-hand side or the right-hand side, as occasion may require. The bracket 14 is of course to be attached to a window-casing or any other similar support by means of screws. The bridge-pieces 3 will prevent a rope from slipping off the sheave or pulley in a lateral direction.

Having thus described my invention, I claim as new and desire to secure by Letters Patent—

In a device for the purpose described, a bifurcated frame having oppositely-extended arms at its ends, cross-pieces connecting the ends of the opposite arms, a shaft carrying a sheave mounted to rotate in said frame, a perforated block on said frame, a clutch-section surrounding the perforation at both sides of the block, a bracket having a clutch-section adapted to engage with either one of the first-named clutch-sections, a spindle on said bracket upon which the block is designed to rotate, and a set-nut on the spindle and engaging with said block, substantially as specified.

ALEXANDER G. MOLTENI.

Witnesses:
  C. R. FERGUSON,
  JNO. M. RITTER.